(12) United States Patent
Takushima et al.

(10) Patent No.: US 6,337,937 B1
(45) Date of Patent: Jan. 8, 2002

(54) OPTICAL FILTER AND METHOD OF MAKING THE SAME

(75) Inventors: Michiko Takushima; Masakazu Shigehara, both of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/313,005

(22) Filed: May 17, 1999

(30) Foreign Application Priority Data

May 18, 1998 (JP) .......................... 10-135543

(51) Int. Cl.[7] .............................. G02B 6/26
(52) U.S. Cl. .................... 385/28; 385/37; 259/341; 430/321
(58) Field of Search .................. 385/37, 124, 127, 385/130, 359, 28; 359/341; 430/321

(56) References Cited

U.S. PATENT DOCUMENTS

| | | | | |
|---|---|---|---|---|
| 5,191,586 A | * | 3/1993 | Huber | 372/6 |
| 5,703,978 A | * | 12/1997 | DiGiovanni et al. | 385/37 |
| 5,764,829 A | * | 6/1998 | Judkins et al. | 385/37 |
| 5,830,622 A | * | 11/1998 | Canning et al. | 430/321 |
| 5,900,970 A | * | 5/1999 | Kakui | 359/341 |
| 6,084,996 A | * | 7/2000 | Judkins et al. | 385/37 |
| 6,111,999 A | * | 8/2000 | Espindola et al. | 385/37 |

OTHER PUBLICATIONS

"Broad–Band Erbium–Doped Fiber Amplifier Flattened Beyond 40 nm Using Long–Period Grating Filter", P. F. Wysocki et al., IEEE Photonics Technology Letters, vol. 9, No. 10, Oct. 1997, pp. 1343–1345.

* cited by examiner

*Primary Examiner*—Brian Healy
*Assistant Examiner*—Omar Rojas
(74) *Attorney, Agent, or Firm*—McDermott, Will & Emery

(57) ABSTRACT

The present invention relates to an optical filter having a plurality of long-period gratings, and a method of making the same. The optical filter according to the present invention comprises a plurality of long-period gratings having attenuation peaks different from each other in a core region thereof, whereas the order of cladding mode in the light attenuated by the plurality of long-period gratings to couple with the core mode thereof varies among these long-period gratings.

8 Claims, 8 Drawing Sheets

OPTICAL FILTER AND METHOD OF MAKING THE SAME

BACKGROUND OF THE INVENTION

1. Field of the Invention

The present invention relates to an optical component applicable to the field of optical communications or the like and, in particular, to an optical filter comprising a long-period grating for eliminating the wavelength dependence of the gain of a fiber amplifier doped with rare earth.

2. Related Background Art

A typical optical fiber communication system comprises an optical transmitter including a light source, an optical fiber line having one end connected to the optical transmitter, and an optical receiver connected to the other end of the optical fiber line. An optical amplifier for amplifying signal light in a predetermined wavelength band is installed in the optical fiber line. Such an optical fiber communication system often utilizes WDM signals in the band of 1.5 $\mu$m and employs, as its amplifier, a fiber amplifier doped with rare earth such as Erbium (Er) or the like. This erbium-doped fiber amplifier (EDFA) forms a population inversion of electron state within the EDFA in response to excitation light having a predetermined wavelength, and induces stimulated emission in response to light in the band of 1.5 $\mu$m incident thereon, thereby amplifying the incident light.

In such an optical fiber communication system, the amplified spontaneous emission (ASE) generated by the mutual action between the power of excitation light and Er ions within the EDFA becomes a noise component. The ASE lowers the gain and increases the noise figure. Also, since the ASE has a power distribution peaking at 1.53 $\mu$m, when optical amplification is repeated by a plurality of EDFAs, their gain may fluctuate among individual wavelength components of signal light (a wavelength dependence may occur in the amplification gain of the optical amplifier) under the influence of the power distribution of ASE. As a consequence, in a WDM (Wavelength Division Multiplexing) communication system for transmitting a plurality of signal light components having wavelengths different from each other, different gains are given to the respective channels (respective signal light components), whereby the bit error rate may become higher in some channels.

A technique using a long-period grating for overcoming these problems is disclosed in a paper titled "Broad-Band Erbium-Doped Fiber Amplifier Flattened Beyond 40 nm Using Long-Period Grating Filter" (IEEE PHOTONICS TECHNOLOGY LETTERS, VOL. 9, NO. 10, °OCT. 1997, pp. 1343–1345).

This long-period grating is a portion of the core region where the refractive index periodically changes along the axis of an optical waveguide, and is a grating which induces coupling between a core mode and a cladding mode in the signal light propagating through the optical waveguide. The period (pitch) of the grating is set such that the optical path difference between the core mode and cladding mode within one period becomes identical to a predetermined wavelength, and thereby yielding a strong power conversion from the core mode to the cladding mode. As a result, since the long-period grating acts to radiate the core mode to the cladding mode, the intensity of the core mode over a narrow band centered at a predetermined wavelength (loss wavelength) is attenuated.

The center wavelength of the wavelength spectrum of light radiated from the core to the cladding by the long-period grating, i.e., loss wavelength, is determined according to the following expression (1):

$$\beta_{core}^{(lm)} - \beta_{clad}^{(n)} = 2\pi/\Lambda \tag{1}$$

where l and m are the order of the core mode (l=0, m=1 in the fundamental mode LP01), $\beta_{core}^{(lm)}$ is the propagation constant defined by (lm), $\beta_{clad}^{(n)}$ is the propagation constant of the n-th order cladding mode, and $\Lambda$ is the grating period of the long-period grating.

Since the propagation constants $\beta_{core}^{(lm)}$, $\beta_{clad}^{(n)}$ are parameters dependent on the wavelength, the loss wavelength of the long-period grating can be controlled when the long-period grating is formed with its grating period $\Lambda$ being adjusted in view of the above-mentioned expression (1).

On the other hand, $\beta_{core}^{(lm)}$, $\beta_{clad}^{(n)}$ are dependent on the effective refractive indexes of the core and cladding, respectively. Consequently, when the grating period $\Lambda$ is set constant, the loss wavelength of the long-period grating mainly depends on the difference between the effective refractive index of the core and the effective refractive index of the cladding in the part formed with the long-period grating (grating forming region). Also, the effective refractive index of the core in the grating forming region can be considered in terms of the average value of modulated refractive index. Consequently, the difference between the effective refractive index of the core and the effective refractive index of the cladding in the grating forming region depends on the average refractive index of the core and the average refractive index of the cladding. Further, the amount of refractive index change (amplitude of refractive index modulation) in the region doped with $GeO_2$ changes in response to the irradiation amount of ultraviolet light for forming the grating. That is, the refractive index of the core itself also changes in response thereto. Eventually, the loss wavelength of the long-period grating can be controlled also by forming the long-period grating with the irradiation amount of ultraviolet light being adjusted, so as to regulate the difference between the effective refractive index of the core and the effective refractive index of the cladding.

SUMMARY OF THE INVENTION

As a result of studies of conventional optical filters, the inventors have found the following problems. Namely, since the gain of an EDFA such as that mentioned above depends on the wavelength, the optical power may fluctuate among the individual wavelength components of the WDM signal light amplified by the EDFA. Therefore, for wavelength components with higher and lower gains, long-period gratings exhibiting greater and smaller amounts of loss are prepared (and inserted in the transmission line), respectively, so as to homogenize the gain.

In general, however, in an optical filter formed by a combination of a plurality of long-period gratings, the overall transmission characteristic of the optical filter would not become the product (or sum in terms of dB) of the transmission characteristics of individual long-period gratings, thereby making it difficult to yield an optical filter having a desirable transmission characteristic as a whole.

In order to overcome the above-mentioned problems, it is an object of the present invention to provide an optical filter which, when applied to an optical transmission system having an optical amplifier, can eliminate the wavelength dependence of gain in the optical amplifier, while having a structure which can be made easily; and a method of making the same.

The optical filter according to the present invention comprises an optical waveguide having a core region with a predetermined refractive index and a cladding region, provided on an outer periphery of the core region, with a refractive index lower than that of the core region, wherein a plurality of long-period gratings are arranged, at least, in the core region. Here, as explicitly indicated in U.S. Pat. No. 5,703,978 as well, the above-mentioned long-period grating is a grating which induces coupling (mode coupling) between core mode light and cladding mode light which propagate through an optical waveguide such as optical fiber, and is clearly distinguishable from a short-period grating which reflects a light component having a predetermined wavelength. Also, for yielding a strong power conversion from the core mode to the cladding mode, the grating period (pitch) in the long-period grating is set such that the optical phase difference between the core mode light and the cladding mode light becomes $2\pi$. Thus, since the long-period grating acts to couple the core mode to the cladding mode, the core mode attenuates over a narrow band centered at a predetermined wavelength (hereinafter referred to as loss wavelength).

Among the plurality of long-period gratings, a first long-period grating attains an attenuation peak at a first wavelength by mode coupling, whereas a first filter region provided with the first long-period grating has a refractive index fluctuating with a first period. Further, among the plurality of long-period gratings, a second long-period grating attains an attenuation peak at a second wavelength, different from the first wavelength, by mode coupling, whereas a second filter region provided with the second long-period grating has a refractive index fluctuating with a second period.

In particular, in the optical filter according to the present invention, the order of cladding mode in the light attenuated by the first long-period grating to couple with its core mode differs from the order of cladding mode in the light attenuated by the second long-period grating to couple with its core mode.

In this configuration, in the respective light components having the first and second wavelengths propagating through the optical waveguide, their core modes are coupled to different orders of cladding modes by their corresponding first and second long-period gratings. Then, attenuation peaks centered at the respective wavelengths are generated. Here, the first attenuation peak is not influenced by other cladding modes having different orders. Namely, since the independence of transmission characteristic can be secured for each long-period grating in the optical filter according to the present invention, a plurality of predesigned long-period gratings may be combined together, thus making it easy to design an optical filter having a desirable transmission characteristic.

In the optical filter according to the present invention, the first and second filter regions can be arranged where at least a part of the first filter region and at least a part of the second filter region overlap each other. Namely, since each of the long-period gratings included in the optical filter according to the present invention secures the independence of its transmission characteristic, they can be arranged as being overlaid on each other within the same section along the longitudinal direction (aligning with the advancing direction of signal light advancing through the core region) of the optical waveguide, whereby the optical filter itself can be made smaller.

The method of making an optical filter according to the present invention having a configuration such as that mentioned above comprises the steps of preparing an optical waveguide having a core region doped with an impurity such as $GeO_2$ or the like for changing the refractive index and a cladding region, provided on an outer periphery of the core region, with a refractive index lower than that of the core region; and irradiating a predetermined part in the core region of thus prepared optical waveguide with grating forming light (which is intensity-modulated along a generating a periodic refractive index fluctuation along the longitudinal direction of the optical waveguide). Here, the optical filter according to the present invention may be configured such that a plurality of optical filters each provided with a long-period grating having a desirable attenuation wavelength are connected in series along the advancing direction of signal light. Specifically, in the method of making an optical filter according to the present invention, a refractive index fluctuation with a first period is generated in a first grating forming region at a predetermined position in the core region, so as to form a first long-period grating attaining an attenuation peak at a first wavelength by mode coupling. Further, a refractive index fluctuation with a second period is generated in a second grating forming region at a predetermined position in the core region, so as to form a second long-period grating attaining an attenuation peak at a second wavelength, different from the first wavelength, by mode coupling.

In particular, in the method of making an optical filter according to the present invention, the first and second periods are set such that the order of cladding mode in the light attenuated by the first long-period grating to couple with the core mode thereof differs from the order of cladding mode in the light attenuated by the second long-period grating to couple with the core mode thereof.

Thus, in the method of making an optical filter according to the present invention, the first and second long-period gratings whose orders of cladding modes coupling with their corresponding core modes differ from each other are formed in a single optical waveguide or in a plurality of optical waveguides prepared for the respective long-period gratings. As mentioned above, the transmission characteristics of these long-period gratings secure their independence from each other, and an optical filter having a desirable transmission characteristic as a whole can be obtained.

In the method of making an optical filter according to the present invention, for reducing the size of the optical filter, it is preferred that the second grating forming region be set at a position where at least a part thereof overlaps at least a part of the first grating forming region.

Further, the method of making an optical filter according to the present invention preferably comprises the steps of measuring a transmission characteristic of the first long-period grating after the first long-period grating is formed; measuring a transmission characteristic of the first and second long-period gratings after the second long-period grating is formed subsequent to the forming of the first long-period grating; and computing differential data between first data concerning thus measured transmission characteristic of the first long-period grating and second data concerning thus measured transmission characteristic of the first and second long-period gratings as third data concerning a transmission characteristic of the second long-period grating. In this configuration, since the transmission characteristic of the optical filter is measured at each long-period grating making step, it can be confirmed whether the respective transmission characteristics of the first and second long-period gratings coincide with their designed values or not.

On the other hand, it has been known that, when an optical waveguide is irradiated with ultraviolet light having a predetermined intensity, the ratio by which the refractive index of the core region changes tends to be higher at the initial stage of irradiation and then converge onto substantially a constant level. Therefore, when the second and third long-period gratings are directly formed in the same grating forming region in an overlying manner, the amount of change in refractive index of the gratings would vary, whereby the overall transmission characteristic of the overlaid assembly may vary.

Hence, in the method of making an optical filter according to the present invention, the core region (grating forming region) of the optical waveguide is uniformly irradiated with a predetermined amount of ultraviolet light beforehand, and then is irradiated in an overlying manner with ultraviolet light which is intensity-modulated along a longitudinal direction of the optical waveguide. As a consequence, the ratio of refractive index change in the long-period grating formed earlier and the ratio of refractive index change in the long-period grating formed later become substantially identical to each other, thus making it easier to obtain an optical filter having a desirable transmission characteristic.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view showing the schematic configuration of an optical filter provided with a plurality of long-period gratings (the case where the order of cladding mode coupling with the core mode is identical between the individual long-period gratings), whereas

FIG. 3A is a view showing the schematic configuration of an optical filter according to the present invention, wherein

FIG. 5A is a view for explaining a first embodiment of the method of making an optical filter according to the present invention, whereas

DESCRIPTION OF THE PREFERRED EMBODIMENTS

In the following, embodiments of the optical filter and the method of making the same according to the present invention will be explained with reference to FIGS. 1A, 1B, 2, 3A, 3B, 4, 5A to 6C, 7, 8, 9A to 9D, 10, 11A to 11E, and 12. Among the drawings, parts or elements identical to each other will be referred to with numerals or letters identical to each other without repeating their overlapping explanations.

The present invention relates to an optical filter comprising a structure in which, while each of a plurality of long-period gratings keeps the independence of its transmission characteristic, a desirable transmission characteristic is realized as a whole.

The transmission characteristic of a long-period grating is determined by solving the following mode coupling equations (expressions (2) and (3)):

$$dA/dz + j\chi_{core}A + jK^m B^m \cdot \exp(2j\delta z) = 0 \quad (2)$$

$$dB^m/dz + j\chi^m_{clad}B^m + jK^m A \cdot \exp(-2j\delta z) = 0 \quad (3)$$

Here, A is the complex amplitude of the core mode, $B^m$ is the complex amplitude of the m-th order cladding mode, and j is the imaginary unit. Also, $\chi_{core}$ is the amount of change in propagation constant of the core mode caused by a rise in refractive index, $\chi^m_{clad}$ is the amount of change in propagation constant of the m-th order core mode caused by a rise in refractive index, and $\kappa^m_{clad}$ is the coupling constant between the core mode and the m-th order cladding mode.

Here, letting $\Lambda$ be the grating period, $\beta_{core}$ be the propagation constant of the core mode, and $\beta^m_{clad}$ be the propagation constant of the m-th order cladding mode, $\delta^m$ is represented by the following expression (4):

$$\delta^m = (\beta_{core} - \beta^m_{clad})/2 \quad (4)$$

and is a parameter determined by the refractive index profile of the optical waveguide, e.g., optical fiber.

The transmission characteristic of the grating in the core mode is determined by $|A(L)/A(0)|^2$ (where L is the grating length) obtained when the above-mentioned differential equations (2) and (3) are solved under the initial condition. The solution of such equations can be expressed by the following matrix (expression (5)):

$$\begin{bmatrix} A(L) \\ B^m(L) \end{bmatrix} = M^m \begin{bmatrix} A(0) \\ B^m(0) \end{bmatrix} \quad (5)$$

where $M^m$ is the matrix representing the mode coupling between the core mode and the m-th order cladding mode.

When one such long-period grating is formed in the optical waveguide, the initial condition of the cladding mode can be set $B^m(0)=0$ (the initial condition of the core mode is $A(0)$), whereby $|A(L)/A(0)|^2$ can be represented by a simple expression. Consequently, by changing the length of the long-period grating, period thereof, and amplitude of refractive index thereof, it is possible to adjust the loss wavelength, amount of loss, and half width to predetermined values.

Figure 1A:
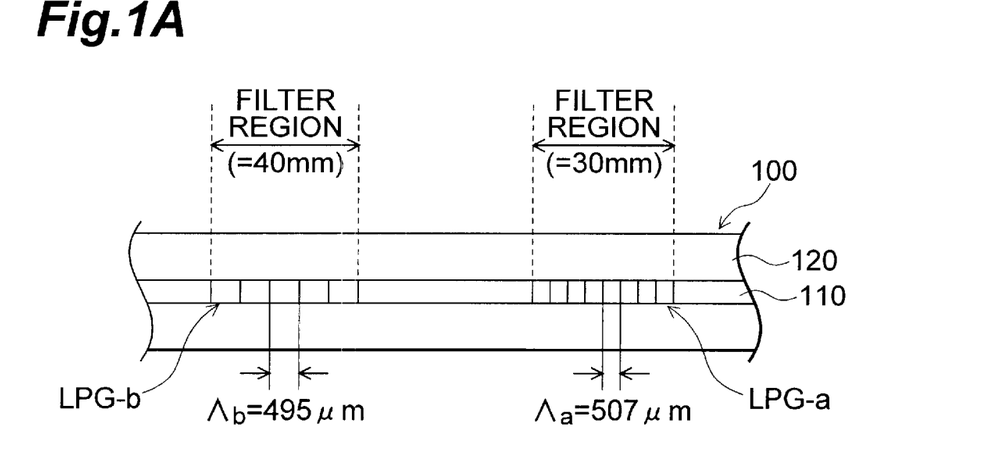
Figure 1B:
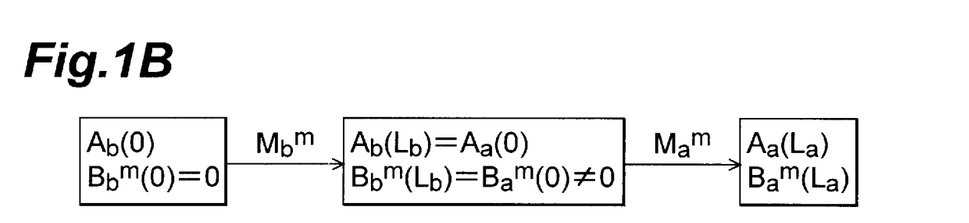
FIG. 1B is a view for explaining the change in complex amplitude between the core mode and a predetermined order of cladding mode caused by each of the long-period gratings shown in FIG. 1A.

FIG. 1A is a view showing the schematic configuration of an optical filter provided with a plurality of long-period gratings. In this drawing, the optical filter 100 is an optical fiber acting as an optical waveguide comprising a core doped with $GeO_2$ and a cladding 120 disposed at the outer periphery of the core 110, in which a plurality of long-period gratings are disposed within the core 110. In the optical filter 100, between the individual long-period gratings formed within the core 110, the order of cladding mode coupling with the core mode is identical.

Specifically, the optical fiber 100 of FIG. 1A is provided with two long-period gratings LPG-a, LPG-b, arranged along the longitudinal direction thereof, having the same order (m-th order) of cladding mode coupling with the core mode. The long-period grating LPG-a has a refractive index modulation period (grating period) $\Lambda a$ of 507 $\mu$m, a grating length La of 30 mm, and a transfer matrix of $Ma^m$. The long-period grating LPG-b has a grating period $\Lambda b$ of 495 $\mu$m, a grating length Lb of 40 mm, and a transfer matrix of $Mb^m$. Here, FIG. 2 is a graph showing the transmission characteristic of the optical filter 100 provided with the long-period gratings LPG-a, LPG-b having the above-mentioned configurations.

In the front-stage long-period grating LPG-b in FIG. 1A, the complex amplitude of the core mode at the initial value Ab(0) (where the initial value $Bb^m(0)$ of the m-th order cladding mode is zero) becomes Ab(Lb), whereas the complex amplitude of the m-th order cladding mode is $Bb^m(Lb)$. While Ab(Lb) becomes the initial value Aa(0) of the core mode in the rear-stage long-period grating LPG-a, $Bb^m(Lb)$ becomes the initial value $Ba^m(0)$ of the m-th order cladding mode in the rear-stage long-period grating LPG-a. Here, since $Ba^m(0)$ is not zero, the m-th order cladding mode $Ba^m(Lb)$ would finally differ from the m-th order cladding mode coupled by the rear-stage long-period grating LPG-a alone (see FIG. 1B). Namely, the respective transmission characteristics of the long-period gratings LPG-a, LPG-b differ from their transmission characteristics when they exist independently from each other.

Figure 2:
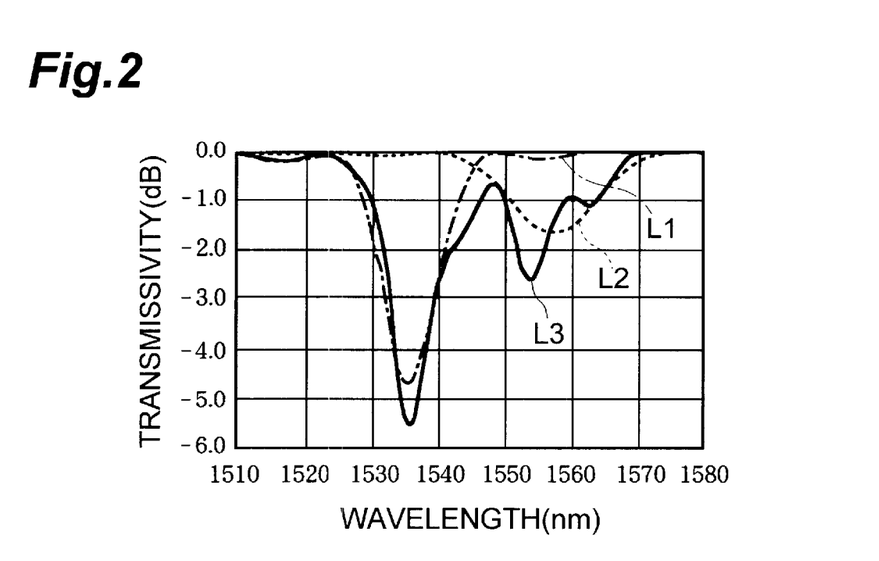
FIG. 2 is a graph showing the transmission characteristic of the optical filter shown in FIGS. 1A and 1B.

When the front-stage grating LPG-b and the rear-stage grating LPG-a are in a mutually dependent relationship as mentioned above, the overall transmission characteristic L3 of the optical filter 100 cannot be expressed as the sum of dB units of the respective transmission characteristics L1, L2 of the long-period gratings LPG-a, LPG-b where the initial value of the m-th order cladding mode is set to 0, as shown in FIG. 2. Namely, if the long-period gratings causing mode coupling between the same order (m-th order) of cladding mode and the core mode within a predetermined band are combined together, the overall transmission characteristic will not become the sum of the respective transmission characteristics of the individual long-period gratings, thus making it very hard to design an optical filter having a desirable characteristic.

Figure 3A:
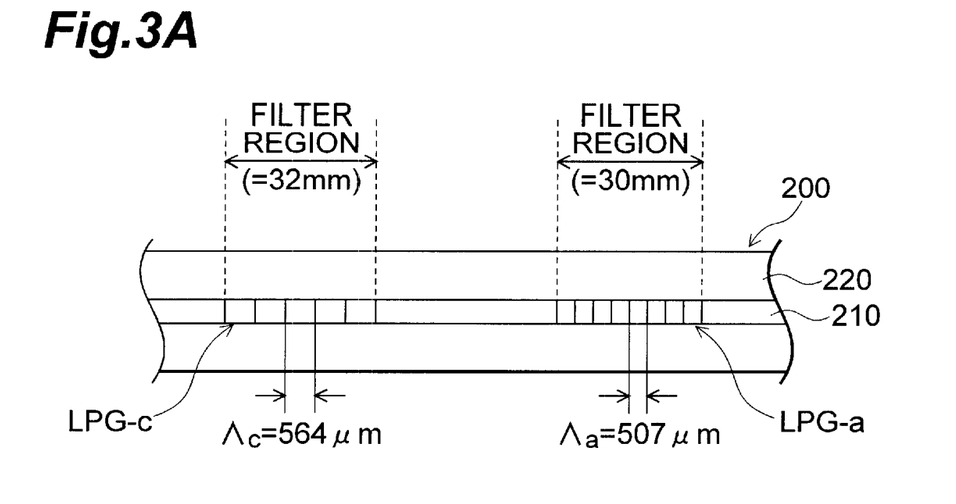
Figure 3B:
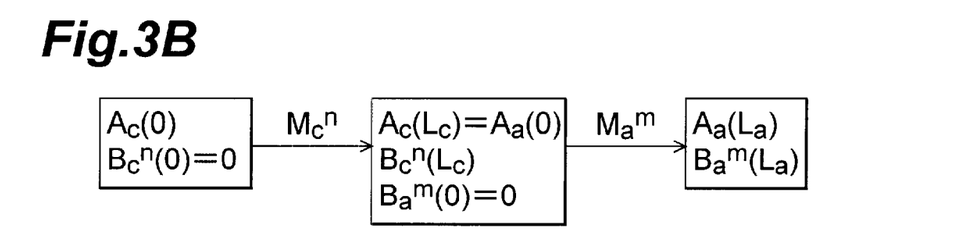
FIG. 3B is a view for explaining the change in complex amplitude between the core mode and a predetermined order of cladding mode caused by each of the long-period gratings shown in FIG. 3A.

FIG. 3A, on the other hand, is a view showing the schematic configuration of one embodiment of the optical filter according to the present invention. In this drawing, the optical filter 200 is an optical fiber acting as an optical waveguide comprising a core doped with $GeO_2$ and a cladding 220 disposed at the outer periphery of the core 210, in which a plurality of long-period gratings are disposed within the core 210. Also, in the optical filter 200, the order of cladding mode coupling with the core mode differs between the individual long-period gratings.

Specifically, the optical fiber 200 of FIG. 3A is provided with two long-period gratings LPG-a, LPG-c, arranged along the longitudinal direction thereof, having different orders (m-th order and n-th order) of cladding mode coupling with the core mode. As with the rear-stage long-period grating in FIG. 1A, the long-period grating LPG-a has a refractive index modulation period (grating period) $\Lambda a$ of 507 $\mu$m and a grating length La of 30 mm. Also, its matrix is function $Ma^m$. On the other hand, the long-period grating LPG-c has a grating period $\Lambda c$ of 564 $\mu$m and a grating length Lc of 32 mm. Also, its transfer matrix is $Mc^n$. Here, FIG. 4 is a graph showing the transmission characteristic of the optical filter 200 according to this embodiment shown in FIG. 3A.

Figure 4:
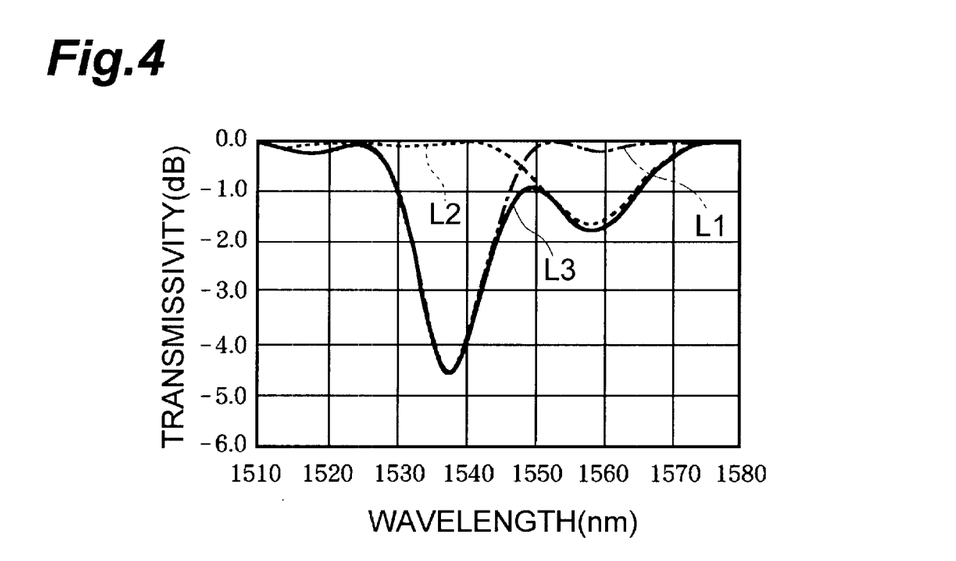
FIG. 4 is a graph showing the transmission characteristic of the optical filter according to the first embodiment shown in FIGS. 3A and 3B.

The long-period gratings LPG-a, LPG-c in the optical filter 200 have different orders (m-th order and n-th order) of cladding mode which can couple with the core propagation mode in the wavelength band shown in FIG. 4. Under such a condition, while the n-th order cladding mode $Bc^n$ (Lc) is generated in the front-stage long-period grating LPG-c (the complex amplitude of the core mode at the initial value Ac (0) becomes Ac(Lc)), this cladding mode hardly generates coupling in the rear-stage grating LPG-a, thus exerting no influences on the characteristic of LPG-a. Therefore, while the initial value Aa(0) of the core mode concerning the rear-stage grating LPG-a can be set to Ac(Lc), the initial value $Ba^m(0)$ of the m-th order cladding mode can be set to 0. As a consequence, the finally obtained complex amplitude Aa(La) of the core mode and complex amplitude $Ba^m$ (La) of the m-th order equal to those in the case where the rear-stage long-period grating LPG-a exists alone (see FIG. 3B).

Namely, when the order of cladding mode that can couple with the core propagation mode within a predetermined band differs between the respective long-period gratings, then the overall transmission characteristic L3 of the optical filter 200 can be expressed as the sum of dB units of the respective transmission characteristics L1, L2 of the long-period gratings LPG-a, LPG-c as shown in FIG. 4. Therefore, in order to couple different orders of cladding mode to the core mode in a predetermined wavelength band, it is necessary for the long-period grating employed in the optical filter according to this embodiment to have at least two kinds of periodic structures, and it is formed such that a relationship of addition or subtraction (in terms of dB units) holds true between the respective transmission characteristics of the individual long-period gratings and the overall transmission characteristic. Subsequently, the loss wavelength of each long-period grating and the amount of attenuation at this wavelength is adjusted by a predetermined method, and thus adjusted long-period gratings are combined together, whereby an optical filter having a desirable transmission characteristic can be made. Contrarily, the transmission characteristic of the optical filter to be manufactured may be set first, and then a plurality of long-period gratings which become equivalent to the initially set transmission characteristic may be combined together to yield the desirable optical filter.

Figure 5A:
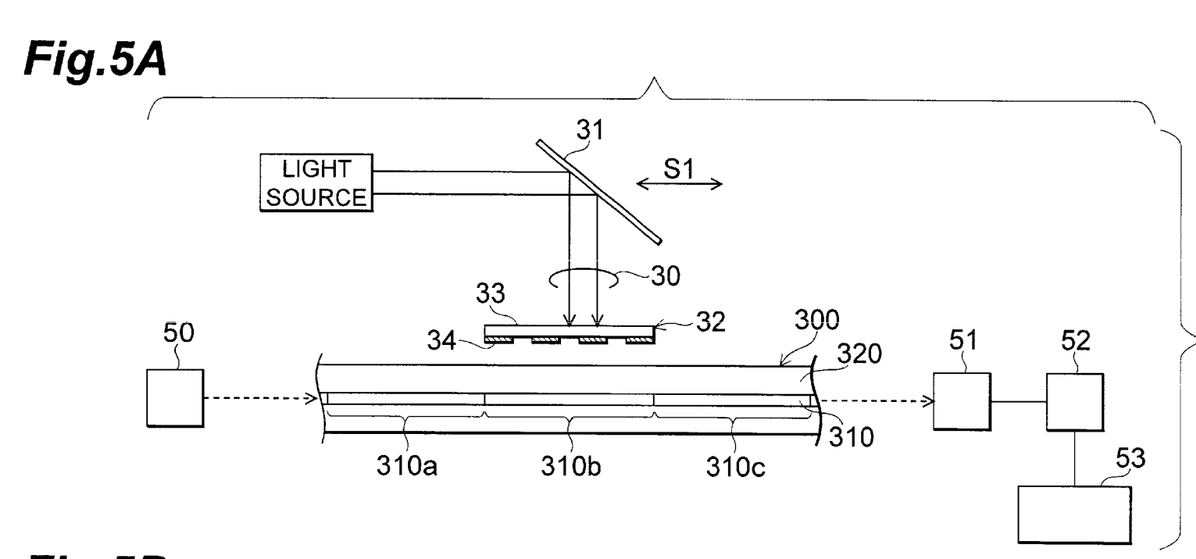
Figure 5B:
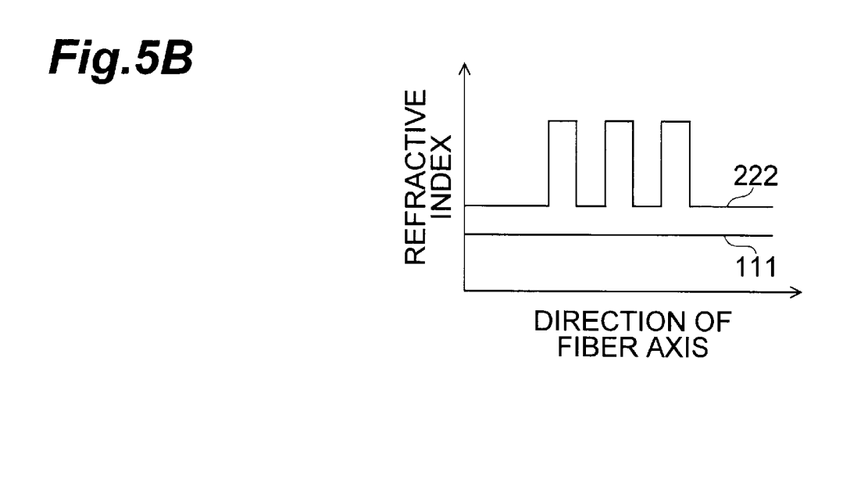
FIG. 5B is a view showing the refractive index profile of a part (filter region formed with a long-period grating) of the optical filter made by this method.

A method of making an optical filter having the above-mentioned configuration will now be explained. FIG. 5A is a view for explaining a first embodiment of the optical filter according to the present invention, whereas FIG. 5B is a chart showing the refractive index profile in each filter region (the region formed with a long-period grating) in the optical filter manufactured by the method shown in FIG. 5A.

Initially, in the first embodiment, an optical fiber 300 as an optical waveguide comprising a core 310 doped with $GeO_2$ and a cladding 320 disposed at the outer periphery of the core 310 is prepared in order to obtain an optical filter. In FIG. 5A, on the optical fiber 300 side, an intensity-modulating mask 32 for intensity-modulating ultraviolet light along the longitudinal direction of the optical fiber 300 is disposed. The intensity-modulating mask 32 is constituted by a silica glass sheet 33 and patterns 34 formed thereon at predetermined intervals for blocking ultraviolet light. Also, an ultraviolet reflecting mirror 31 for guiding ultraviolet light 30 emitted from a light source to the intensity-modulating mask 32 is disposed such that the intensity-modulating mask 32 is held between the mirror 31 and the installed optical fiber 300. The ultraviolet reflecting mirror 31 is movable along the core 310 of the optical fiber 300 (along the directions indicated by arrows S1 in the drawing).

Optically connected to one end of the optical fiber 300 is a semiconductor laser light source 50 emitting measurement light in a usable wavelength band; whereas installed at the other end of the optical fiber 300 are an optical spectrum analyzer 51 for detecting the wavelength of measurement light in a predetermined band passed through the optical fiber 300 and the optical power at this wavelength, a data processing means 52 having a memory for storing electric signals from the optical spectrum analyzer 51 and a CPU for carrying out a predetermined arithmetic operation, and an image display unit 53 for displaying electric signal data from the data processing means 52.

The optical fiber 300 is mainly composed of silica glass, while the core 310 includes germanium which is a refractive index enhancing material. Germanium is known as a photosensitive material for ultraviolet light in the vicinity of wavelength at 248 µm or 193 µm. Namely, germanium-doped silica glass has such a property that, when irradiated with ultraviolet light having the above-mentioned wavelength, its refractive index increases at thus irradiated portion. As a consequence, excimer laser light in the wavelength band of 248 µm is utilized as the ultraviolet light 30 irradiating the optical fiber 300 in this embodiment.

In the intensity-modulating mask 32, a plurality of band-shaped chromium layers 34 are vapor-deposited on the surface of the transparent silica glass sheet 33 at identical intervals. The chromium layers 34 block ultraviolet light beams 30. Consequently, on the chromium-deposited surface of the silica glass sheet 33, light-blocking portions (i.e., chromium layers) and light-transmittable portions (glass surface portions positioned between the individual chromium layers) are alternately arranged in a grating pattern. Therefore, the ultraviolet light passed through the intensity-modulating mask 32 irradiates the optical fiber 300 in a grating pattern. The irradiation light is made incident on the core 310 containing germanium, which is a photosensitive material, and induces a refractive index change in the core 310. As a result, a plurality of parts where the refractive index is locally increased are arranged like a grating along the fiber axis at identical intervals in the core 310 of the optical fiber 300. Thus, as an increase in refractive index is periodically generated in the core 310, a long-period grating having a desirable transmission characteristic is formed at a desirable region (grating forming region) of the core 310.

Initially, in the first embodiment, the inside of the grating forming region 310a to become a filter region is irradiated with the ultraviolet light beams 30 by way of the intensity-modulating mask 32, whereby the first long-period grating is formed in the core 310 of the optical fiber 300. FIG. 5B shows a refractive index profile of thus formed first long-period grating. Here, in FIG. 5A, 310a to 310c indicate grating forming regions to become filter regions in the core 310.

Subsequently, measurement light is emitted into the core 310. Thus emitted measurement light is transmitted through the first long-period grating and is received by the optical spectrum analyzer 51. Here, the first long-period grating has such a transmission characteristic that, of measurement light in a predetermined wavelength band, a measurement light component centered at a wavelength of λ1 is attenuated. The transmission characteristic data of the first long-period grating outputted from the optical spectrum analyzer 51 is fed to the data processing means 52. The transmission characteristic data of the first long-period grating is stored in the memory and is fed to the image display unit 53. The transmission characteristic data fed from the data processing means 52 can be displayed as a graph in the image display unit 53.

Figure 6A:
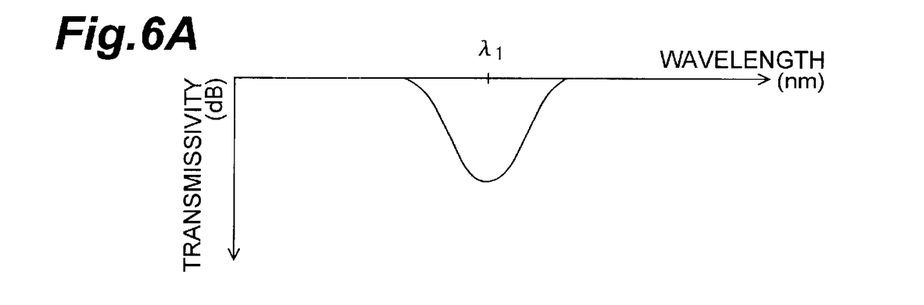
FIGS. 6A to 6C are graphs for explaining the transmission characteristics of the optical filter obtained after the respective steps of the method shown in FIG. 5A.
Figure 6B:
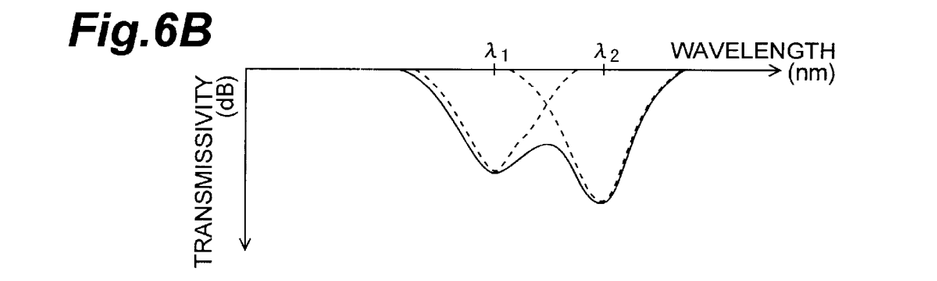
Figure 6C:
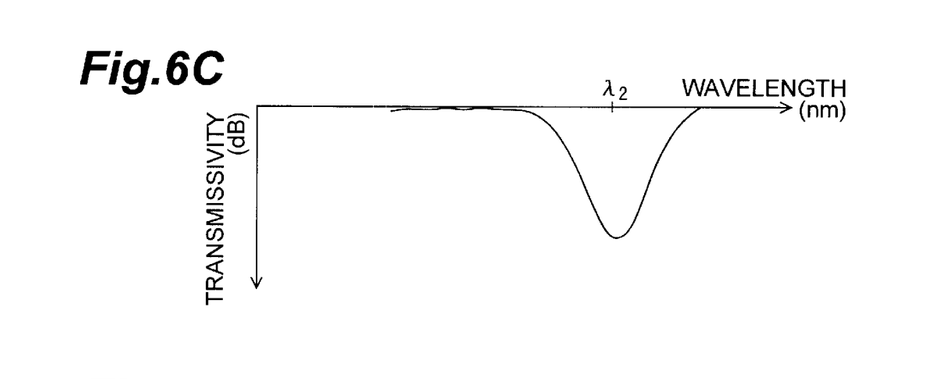

FIG. 6A is a graph of the transmission characteristic of the first long-period grating displayed in the image display unit 53, from which it can be seen that the first long-period grating attains an attenuation peak at a loss wavelength of λ1. At this point of time, it can be confirmed whether or not the transmission characteristic concerning the first long-period grating formed within the core 310 displayed in the image display unit 53 coincides with its designed transmission characteristic.

Subsequently, in FIG. 5A, the grating forming region 310b adjacent to the grating forming region 310a is irradiated with the ultraviolet light beams 30 by way of another intensity-modulating mask 32, so as to form a second long-period grating having a transmission characteristic for attenuating light centered at a wavelength of λ2.

At the point of time when the second long-period grating is formed, the measurement light re-emitted from the light source 50 successively passes through the first and second long-period gratings and then is received by the optical spectrum analyzer 51. Here, the second long-period grating has a transmission characteristic for attenuating a measurement light component centered at the wavelength of λ2. The transmission characteristic data of the first and second long-period gratings shown in FIG. 6B outputted from the optical spectrum analyzer 51 is fed to the data processing means 52. Further, third transmission characteristic data, which is differential data between thus fed transmission characteristic data of the first and second long-period gratings and the transmission characteristic data of the first long-period grating stored in the data processing means 52, is computed in the data processing means 52 (see FIG. 6C). If thus computed third transmission characteristic data coincides with the designed transmission characteristic of the second long-period grating, then it can be confirmed that the first and second long-period gratings have desirable transmission characteristics.

In the manufacturing method according to this embodiment, the grating periods of the first and second long-period gratings are determined theoretically or empirically, and the period of light-shielding pattern in each intensity-modulating mask 32 is determined according thereto. The amount of attenuation at the loss wavelength λ is adjusted by the irradiation amount of the ultraviolet light irradiated by way of the intensity-modulating mask 32.

Though the manufacturing method according to the first embodiment relates to the case where a plurality of long-period gratings are independently arranged in the longitudinal direction in a cascading manner, a case where a plurality of long-period gratings are formed within the same section in an overlying manner will now be explained. Individual manufacturing means in each step are the same as those in the above-mentioned method. Here, the optical filter in the first embodiment may also be constructed by optically coupling a plurality of optical filters each having a single long-period grating.

It has been known that the ratio by which the refractive index in the core 310 increases when the prepared optical fiber 300 is irradiated beforehand with ultraviolet light having a predetermined intensity tends to be higher at the initial stage of irradiation and then converge onto substantially a constant level. Therefore, in the case where a plurality of long-period gratings are directly formed in the optical fiber 300 as being overlaid on each other, the later the long-period grating is formed, the more the ratio of increase in refractive index differs from the initial ratio, whereby the transmission characteristic of the obtained optical filter greatly deviates from the desirable transmission characteristic. Hence, as a method of evading this problem, the inventors have found that, when the core of an optical waveguide (optical fiber in this embodiment) is uniformly irradiated with a predetermined amount of ultraviolet light beforehand and then is successively exposed to ultraviolet light beams in an overlying manner, the ratio of increase in refractive index caused by the overlying exposure becomes substantially constant.

Figure 7:
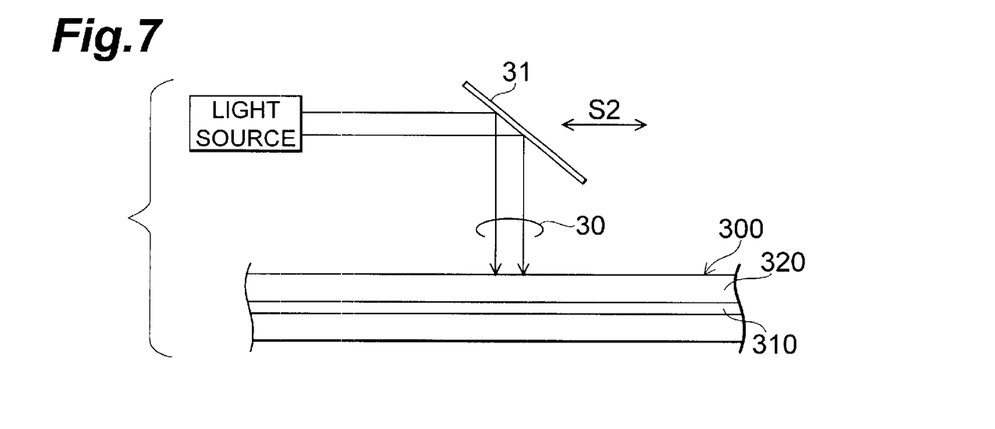
FIG. 7 is a view for explaining an ultraviolet light irradiation process in the method of making an optical filter according the present invention.

FIG. 7 is a view showing a method of uniformly irradiating the grating forming region in the core 310 with a predetermined amount of ultraviolet light before forming a long-period grating. As shown in FIG. 7, the ultraviolet light beams 30 irradiate the optical fiber 300 along the axis thereof by way of the ultraviolet light reflecting mirror 31 disposed so as to be movable along the axis of the optical fiber 300 (movable in the directions indicted by arrows S2 in the drawing). As the mirror 31 is moved at a constant speed, the core 310 of the optical fiber 300 is irradiated with uniform ultraviolet light. The ultraviolet light beams 30 are the same as those used in the ultraviolet light irradiation system shown in FIG. 5A. It has been empirically confirmed that an irradiation amount of at least 200 J/cm$^2$ is necessary for yielding the above-mentioned effects in such an irradiation system.

Figure 8:
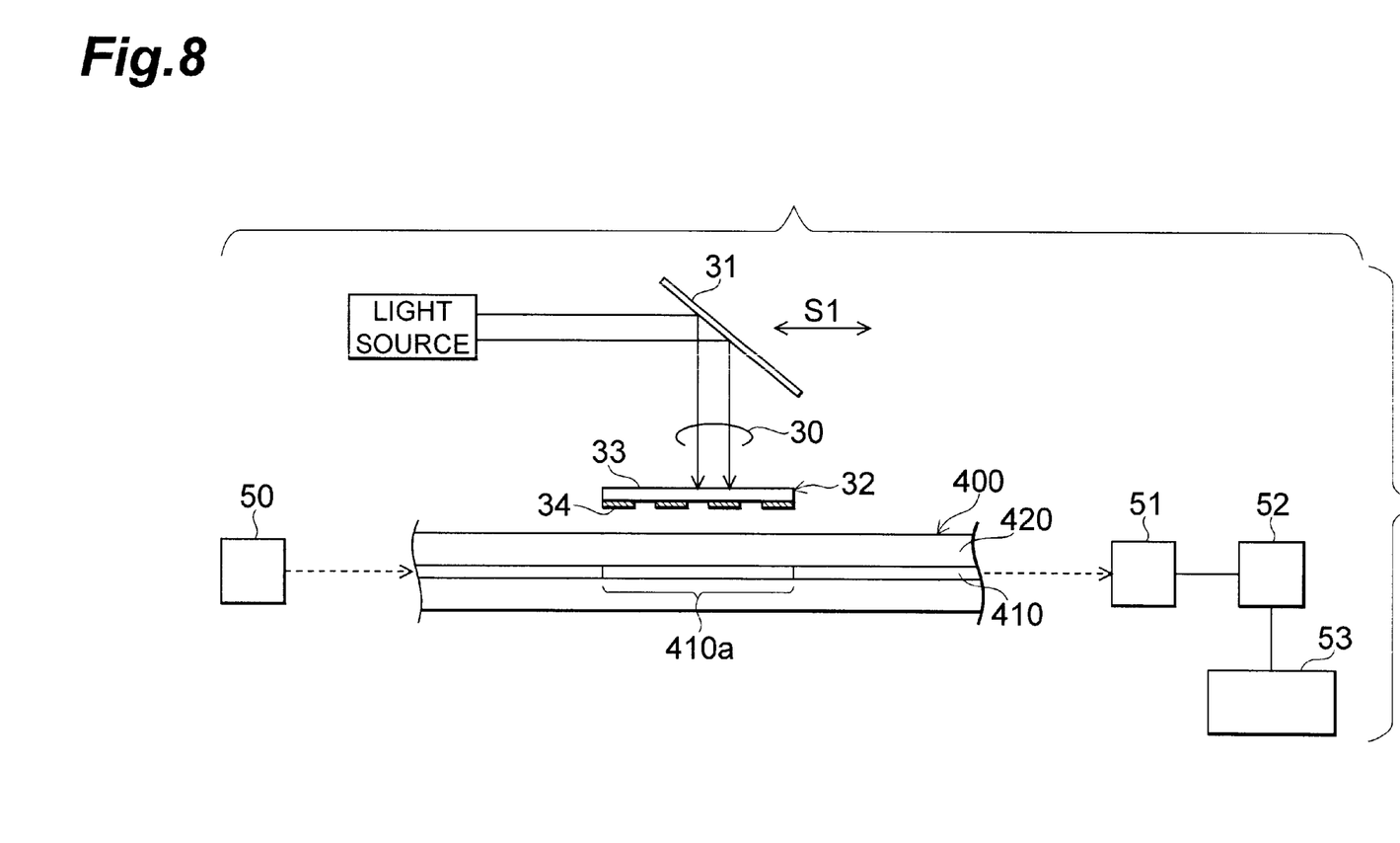
FIG. 8 is a view for explaining a second embodiment of the method of making an optical filter according to the present invention.

FIG. 8 is a view for explaining a second embodiment of the method of making an optical filter according to the present invention. In the optical fiber 400 (having a core 410 doped with GeO$_2$ and a cladding 420 disposed at the outer periphery of the core 410) prepared here, at least a grating forming region 410a to become a filter region is uniformly irradiated with ultraviolet light along the longitudinal direction of the core 410. In the second embodiment, a plurality of long-period gratings are formed within the grating forming region 410a in an overlying manner. FIGS. 9A to 9D are views for showing the configurations of the long-period gratings (FIGS. 9B to 9D) and optical filter (FIG. 9A) formed by the manufacturing method shown in FIG. 8.

Figure 9A:
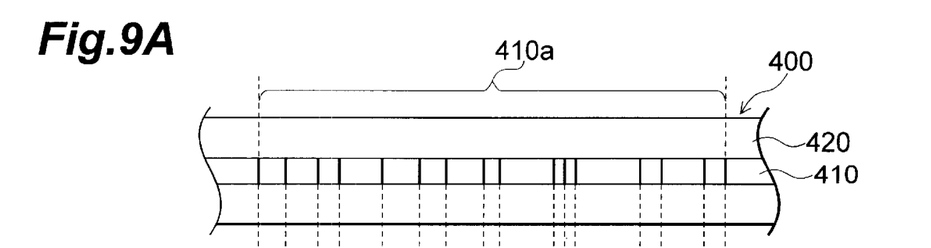
FIGS. 9A to 9D are views for explaining the configuration of the optical filter obtained by the method of making an optical filter according to the second embodiment shown in FIG. 8.
Figure 9B:
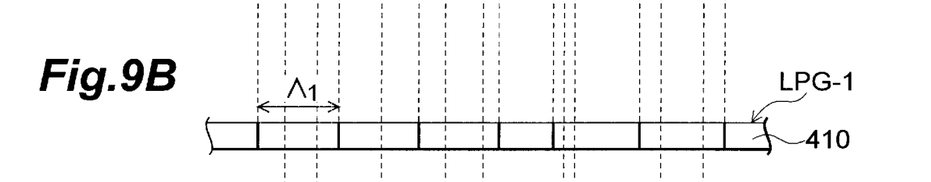

Initially, in FIG. 8, the intensity-modulating mask 32 is irradiated with ultraviolet light beams 30, and the grating forming region 410a is exposed to the ultraviolet light passed through the intensity-modulating mask 32. In the grating forming region 410a of the core 410, a first long-period grating whose period of refractive index change (grating period) is Λ1 is formed. FIG. 9B shows the periodic structure of the first long-period grating (LPG-1) formed within the grating forming region 410a. The transmission characteristic of the first long-period grating is measured by the method explained with reference to FIGS. 6A to 6C. In this case, it can be confirmed that the transmission characteristic of the first long-period grating attenuates light centered at a wavelength λ1.

Figure 9C:
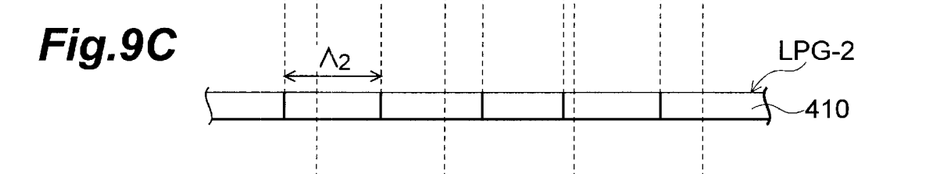

Subsequently, in FIG. 8, the grating forming region 410a formed with the first long-period grating is further exposed to the ultraviolet light beams 30 by way of a second intensity-modulating mask 32, so as to form a second long-period grating having a periodic structure in which the refractive index change within the grating forming region 410a is a period of Λ2. FIG. 9C shows the periodic structure of the second long-period grating (LPG-2) formed in the grating forming region 410a. The transmission characteristic of the second long-period grating can also be measured by the method explained with reference to FIGS. 6A to 6C. In this case, it can be confirmed that the transmission characteristic of the second long-period grating attenuates light centered at a wavelength λ2.

Figure 9D:
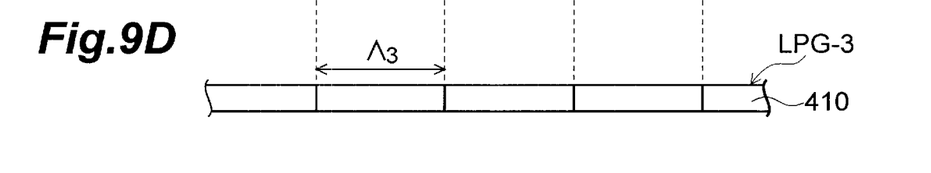

By a similar method, a third long-period grating whose period of change in refractive index is Λ3 is formed within the grating forming region 410a. FIG. 9D shows the periodic structure of the third long-period grating (LPG-3). The transmission characteristic of the third long-period grating can also be measured by the method explained with reference to FIGS. 6A to 6C. In this case, it can be confirmed that the transmission characteristic of the third long-period grating attenuates light centered at a wavelength λ3.

Thus, a desirable optical filter is also obtained when the first to third long-period gratings (having attenuation peak wavelengths of λ1 to λ3, respectively) are formed within the grating forming region 410a of the optical fiber 400 in an overlying manner. Here, FIG. 9A shows the periodic structure of the optical filter according to the second embodiment in which a plurality of long-period gratings are formed in the grating forming region 410a in an overlying manner.

Figure 10:
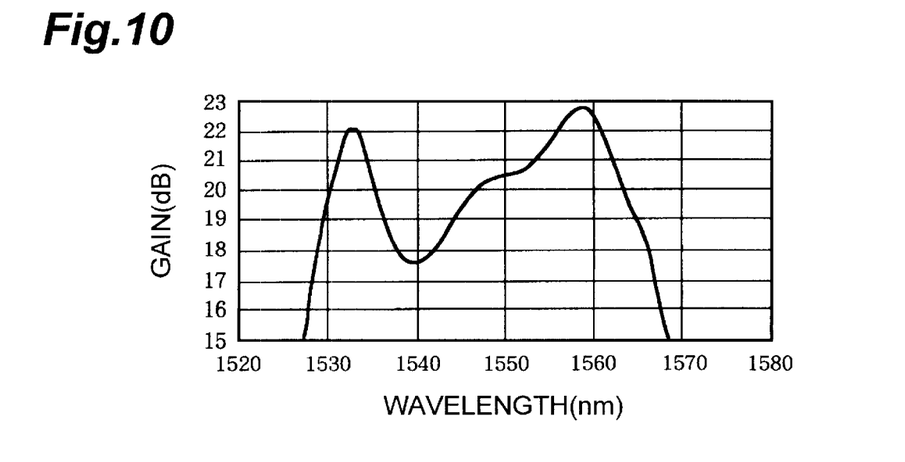
FIG. 10 is a graph showing the gain characteristic of an EDFA (Erbium-Doped Fiber Amplifier)

By making optical filters according to the above-mentioned embodiments and applying them to an optical transmission system having an EDFA, the inventors have succeeded in improving the wavelength dependence of amplification gain in the EDFA. FIG. 10 is a graph showing the gain characteristic of the EDFA having a wavelength dependence. Since the gain characteristic of the EDFA shown in FIG. 10 has gain peaks at wavelengths of 1533 nm, 1548 nm, and 1558 nm, the gain can be flattened by use of an optical filter having attenuation peaks corresponding to these gain peaks.

FIGS. 11A to 11E are graphs of transmission characteristics (having such attenuation peaks that, in response to the wavelengths where the gain is maximized, their respective gain maximum values are flattened) required for an optical filter for flattening the plurality of gain peaks shown in FIG. 10.

Explained in the following is a case where three kinds of long-period gratings satisfying the above-mentioned transmission characteristics are designed and are made by use of the manufacturing system shown in FIG. 5A.

Figure 11A:
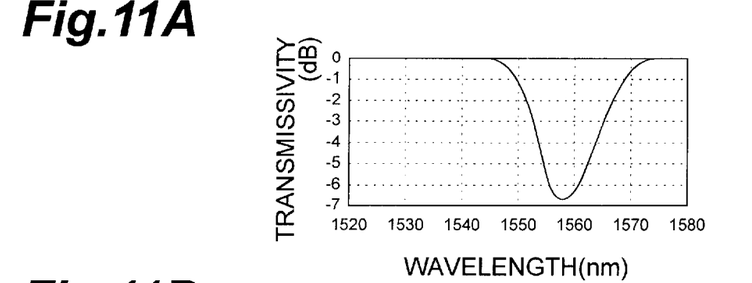
FIGS. 11A to 11E are graphs showing the transmission characteristics of respective intermediate products in the individual steps of the method of making an optical filter according to the present invention.
Figure 11B:
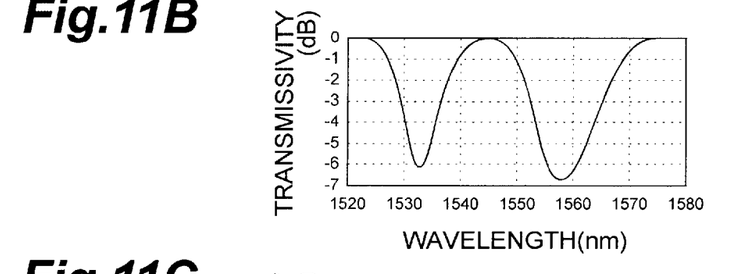

Step 1:

Initially, in FIG. 5A, the grating forming region 310a is irradiated with ultraviolet light beams 30 by way of the intensity-modulating mask 32, so that a first long-period grating having a grating period of 411 μm and a grating length of 17.5 mm is formed. Subsequently, it is confirmed whether thus formed first long-period grating has been formed as designed or not. Namely, measured light in a predetermined wavelength band is emitted from the light source 50 into the core 310. Thus emitted measurement light passes through the first long-period grating, so as to be received by the optical spectrum analyzer 51, and is fed to the data processing means 52. The transmission characteristic data concerning the first long-period grating fed to the data processing means 52 is stored in the memory and is fed to the image display unit 53, so as to display graphics. FIG. 11A shows the transmission characteristic displayed in the image display unit 53. The inventors have confirmed that the attenuation peak wavelength and attenuation amount of the transmission characteristic shown in FIG. 11A coincide with their designed values.

Figure 11C:
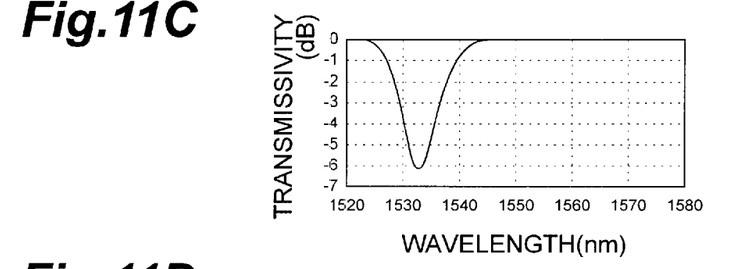
Figure 11D:
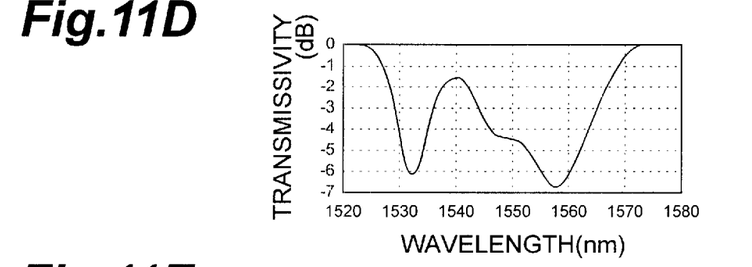

Step 2:

Subsequent to the above-mentioned step 1, in FIG. 5A, the grating forming region 310b adjacent to the grating forming region 310a is irradiated with the ultraviolet light beams 30 by way of another intensity-modulating mask 32, so that a second long-period grating having a grating period of 462 μm and a grating length of 26 mm is formed. Subsequently, the measurement light from the light source 50 is utilized for confirming the transmission characteristic of thus formed second long-period grating. Namely, the measurement light emitted from the light source 50 successively passes through the first and second long-period gratings, so as to be received by the optical spectrum analyzer 51, and is fed to the data processing means 52. While the transmission characteristic data concerning the first and second long-period gratings (see FIG. 11B) fed to the data processing means 52 is stored in the memory, the third transmission characteristic data shown in FIG. 11C is obtained as differential data between the transmission characteristic data concerning the first and second long-period gratings and the transmission characteristic data concerning the first long-period grating (see FIG. 11A) stored in the memory of the data processing means 52 in the step 1 (subtracted in terms of dB unit). The inventors have confirmed that the attenuation peak wavelength and attenuation amount of the transmission characteristic of the second long-period grating shown in FIG. 11C coincide with their designed values.

Figure 11E:
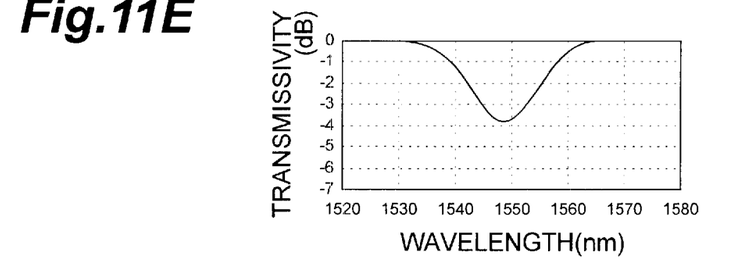

Step 3:

Then, in FIG. 5A, another grating forming region 310c adjacent to the grating forming region 310b is irradiated with the ultraviolet light beams 30 by way of a third intensity-modulating mask 32, whereby a third long-period grating having a grating period of 529 μm and a grating length of 15 mm is newly formed. Here, by means of the measurement light emitted from the light source 50, the transmission characteristic concerning the first to third long-period gratings can be measured. Namely, the measurement light emitted from the light source 50 passes through the first to third long-period gratings, so as to be received by the optical spectrum analyzer 51, and is fed to the data processing means 52. While the transmission characteristic data concerning the first to third long-period gratings (see FIG. 11D) fed to the data processing means 52 is stored in the memory, the fourth transmission characteristic data shown in FIG. 11E is obtained as differential data between the transmission characteristic data concerning the first to third long-period gratings and the transmission characteristic data concerning the first and second long-period gratings (see FIG. 11B) stored in the memory of the data processing means 52 in the step 2 (subtracted in terms of dB unit). The inventors have confirmed that the attenuation peak wavelength and attenuation amount of the transmission characteristic of the third long-period grating shown in FIG. 11C coincide with their designed values.

Figure 12:
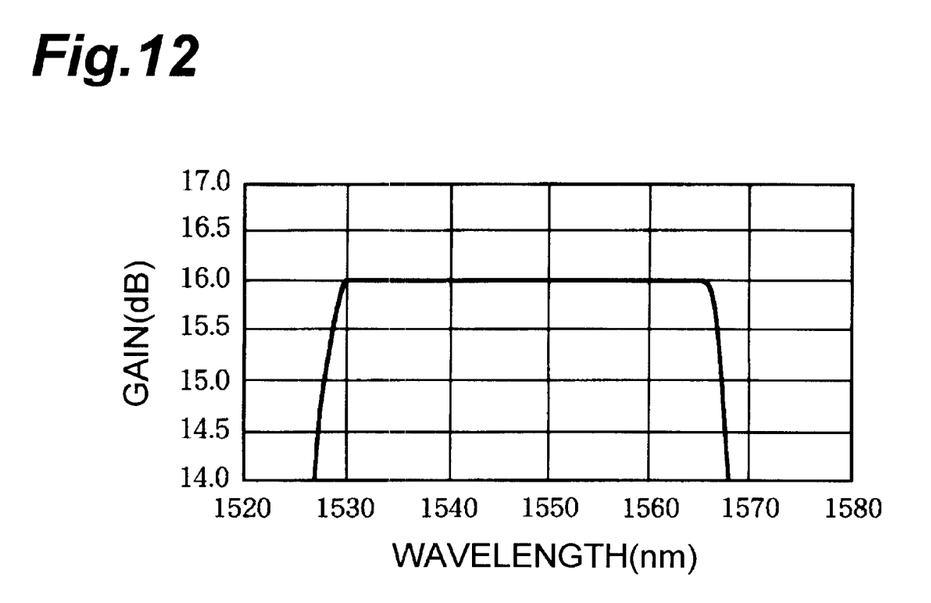
FIG. 12 is a graph showing the gain characteristic in a transmission line employing the EDFA having the gain characteristic shown in FIG. 10 and the optical filter according to the present invention.

Further, the inventors constructed an amplifier unit by using an optical filter having thus formed first to third long-period gratings and an EDFA having the gain characteristic shown in FIG. 10 together. As a result, as shown in FIG. 12, it was able to homogenize the amplification gain of the amplifier unit to substantially 16 dB over a wavelength band of 1530 nm to 1565 nm.

In the present invention, as explained in the foregoing, since a plurality of long-period gratings having attenuation wavelengths different from each other and coupling different orders of cladding mode to the core mode are disposed in the optical waveguide, independence can be secured in the transmission characteristic of each long-period grating. As a consequence, it is effective in that an optical filter having a desirable transmission characteristic can easily be obtained by combining a plurality of predesigned long-period gratings.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical filter comprising:

an optical waveguide having a core region which has a predetermined refractive index, and a cladding region which is provided on an outer periphery of said core region and has a lower refractive index than said core region;

a first filter region arranged at a predetermined position at least in said core region, and provided with a first long-period grating attaining an attenuation peak at a first wavelength by mode coupling, a refractive index of said first filter region varying with a first period; and a second filter region arranged at a predetermined position at least in said core region, and provided with a second long-period grating attaining an attenuation peak at a second wavelength different from said first wavelength by mode coupling, a refractive index of said second long-period grating varying with a second period;

wherein the order of cladding mode in light attenuated by said first long-period grating to couple with a core mode thereof differs from the order of cladding mode in light attenuated by said second long-period grating to couple with a core mode thereof.

2. An optical filter according to claim 1, wherein said first and second filter regions are arranged where at least a part of said first filter region and at least a part of said second filter region overlap each other.

3. A method of making the optical filter of claim 1, said method comprising the steps of:

preparing an optical waveguide having a core region doped with an impurity for changing a refractive index, and a cladding region provided on an outer periphery of said core region and having a lower refractive index than said core region;

generating a refractive index fluctuation with a first period in a first grating forming region at a predetermined position in said core region, so as to form a first long-period grating attaining an attenuation peak at a first wavelength by mode coupling; and generating a refractive index fluctuation with a second period in a second grating forming region at a predetermined position in said core region, so as to form a second long-period grating attaining an attenuation peak at a second wavelength different from said first wavelength by mode coupling;

wherein said first and second periods are set such that the order of cladding mode in light attenuated by said first long-period grating to couple with a core mode thereof differs from the order of cladding mode in light attenuated by said second long-period grating to couple with a core mode thereof.

4. A method according to claim 3 wherein said second grating forming region is set where at least a part thereof overlaps at least a part of said first grating forming region.

5. A method according to claim 4, further comprising the step of:

uniformly irradiating said first and second grating forming regions with grating forming light along a longitudinal direction of said core region before forming said first and second long-period gratings.

6. A method according to claim 3, further comprising the steps of:

measuring, after forming said first long-period grating, a transmissivity of thus formed first long-period grating at each wavelength within a predetermined wavelength band;

measuring, after said second long-period grating is formed subsequent to the forming of said long-period grating, a transmissivity of thus formed first and second long-period gratings at each wavelength within said predetermined wavelength band; and computing differential data between first data concerning thus measured transmissivity of said first long-period grating and second data concerning thus measured transmissivity of said first and second long-period gratings as third data concerning said second long-period grating.

7. A method according to claim 6, further comprising the step of:

uniformly irradiating said first and second grating forming regions with grating forming light along a longitudinal direction of said core region before forming said first and second long-period gratings.

8. A method according to claim 6, wherein said predetermined wavelength band includes a range between said first and second wavelengths.

* * * * *